United States Patent [19]

Eichenauer et al.

[11] Patent Number: 5,274,031

[45] Date of Patent: Dec. 28, 1993

[54] POLYMER ALLOYS OF HIGH AGEING RESISTANCE

[75] Inventors: Herbert Eichenauer, Dormagen; Alfred Pischtschan, Kuerten; Christian Lindner, Cologne, all of Fed. Rep. of Germany

[73] Assignee: Bauer AG, Leverkusen, Fed. Rep. of Germany

[21] Appl. No.: 435,057

[22] Filed: Nov. 13, 1989

[30] Foreign Application Priority Data

Nov. 24, 1988 [DE] Fed. Rep. of Germany ....... 3839588

[51] Int. Cl.$^5$ .................. C08L 51/04; C08L 51/06; C08L 51/08
[52] U.S. Cl. ........................... 525/64; 525/71
[58] Field of Search ............ 525/63, 64, 71, 69

[56] References Cited

U.S. PATENT DOCUMENTS

| | | | |
|---|---|---|---|
| 4,652,614 | 3/1987 | Eichenauer et al. | 525/71 |
| 4,806,593 | 2/1989 | Kress et al. | 525/63 |
| 4,916,186 | 4/1990 | Burk et al. | 525/71 |

FOREIGN PATENT DOCUMENTS

| | | |
|---|---|---|
| 0154244 | 9/1985 | European Pat. Off. . |
| 0220160 | 4/1987 | European Pat. Off. . |
| 0249964 | 12/1987 | European Pat. Off. . |
| 0260552 | 3/1988 | European Pat. Off. . |
| 8502192 | 5/1985 | PCT Int'l Appl. . |

OTHER PUBLICATIONS

Derwent Abstract of J47030751, "Thermoplastic resin compsns–of good impact resistance and weather resistance".

Primary Examiner—Ralph H. Dean
Attorney, Agent, or Firm—Connoly and Hutz

[57] ABSTRACT

Molding compounds of

A) 5 to 95 parts by weight of a graft product of resin-forming monomers on a particulate silicone rubber having a total rubber content of from 30 to 90% by weight and B) 95 to 5 parts by weight of resin-forming monomers on a particulate EPDM rubber having a total rubber content of 10 to 50% by weight and C) 10 to 200 parts by weight (based on 100 parts by weight A+B) of a graft product of resin-forming monomers on a particulate acrylate rubber having a total rubber content of from 30 to 80% by weight.

3 Claims, No Drawings

POLYMER ALLOYS OF HIGH AGEING RESISTANCE

This invention relates to polymer alloys having high weathering and ageing resistance, good processing properties and high strength at low temperatures.

Polymer alloys of high ageing resistance are known and include, for example, graft polymers based on crosslinked acrylate rubbers in combination with a thermoplastic resin, so-called ASA polymers (cf. for example DE-AS 12 60 135, DE-OS 19 11 882, DE-OS 28 26 925, EP-A 71 098) and graft polymers based on ethylene/propylene/diene rubbers (EPDM rubbers) in combination with a thermoplastic resin, so-called AES polymers (cf. for example DE-OS 28 30 232, DE-OS 30 01 766, EP-A 121 327, EP-A 134 154).

Whereas both ASA and AES polymers show high strength at room temperature, their strength decreases rapidly with falling temperature, leading ultimately to brittle fracture at temperatures of from about 0° C. to −40° C.

It has been found that thermoplastic polymer alloys combining very high weathering resistance with high strength at low temperatures are obtained when AES systems, in which the rubber phase has a special particle size, are combined with ASA systems, in which the rubber phase has a special particle size, and with graft products based on silicone rubber having a special particle size. The resulting thermoplastic polymer alloys are also distinguished by improved processing properties.

The present invention relates to thermoplastic molding compounds of

A) 5 to 95 parts by weight and preferably 20 to 80 parts by weight of a graft product of a mixture of 50 to 100 parts by weight and preferably 60 to 95 parts by weight styrene, α-methyl styrene, vinyl toluene, preferably p-methyl styrene, methyl methacrylate or mixtures thereof and 0 to 50 parts by weight and preferably 5 to 40 parts by weight acrylonitrile on a particulate silicone rubber with a mean particle diameter ($d_{50}$) of from 0.10 to 0.50 μm and preferably from 0.10 to 0.15 μm or from 0.25 to 0.50 μm having a total rubber content of from 30 to 90% by weight and preferably from 40 to 80% by weight and B) 95 to 5 parts by weight and preferably 80 to 20 parts by weight of a graft product of a mixture of 50 to 100 parts by weight styrene, α-methyl styrene, vinyl toluene, preferably p-methyl styrene, methyl methacrylate or mixtures thereof and 0 to 50 parts by weight and preferably 5 to 40 parts by weight acrylonitrile on a particulate EPDM rubber with a mean particle diameter ($d_{50}$) of from 0.20 to 1.00 μm and preferably from 0.25 to 0.40 μm or from 0.35 to 0.60 μm having a total rubber content of from 10 to 50% by weight and preferably from 10 to 40% by weight and C) 10 to 200 parts by weight and preferably 20 to 100 parts by weight (based on 100 parts by weight A+B) of a graft product of a mixture of 50 to 100 parts by weight and preferably 60 to 95 parts by weight styrene, α-methyl styrene, vinyl toluene, preferably p-methyl styrene, methyl methacrylate or mixtures thereof and 0 to 50 parts by weight and preferably 5 to 40 parts by weight acrylonitrile on a particulate acrylate rubber with a mean particle diameter ($d_{50}$) of from 0.05 to 1.00 μm and preferably from 0.08 to 0.15 μm or from 0.30 to 0.60 μm having a total rubber content of from 30 to 80% by weight and preferably from 40 to 75% by weight.

The graft products based on silicone rubber which may be used in the production of the molding compounds according to the invention are obtained by radical polymerization of vinyl monomers or mixtures of vinyl monomers in the presence of silicone rubber, more especially in the presence of silicone rubber in emulsion form, the monomers being at least partly grafted onto the rubber. Suitable vinyl monomers are, for example, styrene, nucleus- or side-chain-substituted styrenes, more especially p-methyl styrene and α-methyl styrene, halogen-substituted styrenes, for example chlorostyrene or bromostyrene, vinyl naphthalene, derivatives of $\alpha,\beta$-unsaturated mono- or dicarboxylic acids, more especially $C_{1-5}$ alkyl esters of acrylic or methacrylic acid, preferably methyl methacrylate, or the nitriles of acrylic acid or methacrylic acid, maleic anhydride, N-phenyl maleic imide or mixtures thereof.

A preferred monomer mixture is a combination of styrene and/or α-methyl styrene and acrylonitrile, preferably in a ratio by weight of (α-methyl) styrene to acrylonitrile of 1:1 to 10:1.

Suitable silicone rubbers are, for example, the compounds described in DE-OS 36 29 763 which constitutes essentially chemically linked siloxane groups corresponding to the general formulae $R_2SiO$, $RSiO_{3/2}$, $R_2R^3SiO_{1/2}$, $R^1CH=CH-(R^2)-$ and $H-S-$, where R is a monofunctional, saturated hydrocarbon radical, more especially $CH_3$, phenyl, $C_2H_5$, optionally substituted by SH, halogen, $C_{1-6}$ oxyalkyl, $R^1$ is H, $C_{1-6}$ alkyl, more especially H, $CH_3$, $R^2$ is a single bond, $C_{1-4}$ alkylene, more especially $-CH_2-$, $-C_2H_4-$, a single bond and $R^3$ has the same meaning as R or represents OH, the quantities of the individual siloxane units being gauged in such a way that 0 to 0.5 mols of units $R_2R^3SiO_{1/2}$, 0 to 10 mols of units of the formula $RSiO_{3/2}$ and 0 to 3 mols of units of the formula $SiO_{4/2}$ are present per 100 mols of units of the formula $R_2SiO$.

Other suitable silicone rubbers are of core/shell structure, for example particulate silicone rubbers surrounded by a shell of crosslinked acrylate rubber (cf. DE-OS 36 17 267) or particulate silicone rubbers containing a core of crosslinked acrylate rubber (cf. DE-OS 37 20 475) or of a styrene/acrylonitrile copolymer (cf. DE-OS 37 20 476). The graft products based on silicone rubbers are preferably produced by emulsion polymerization using at least partly crosslinked silicone rubbers present in emulsion form as the graft base.

Graft polymerizations of this kind are known and are preferably carried out temperatures of 30° C. to 100° C. using radical initiators, for example organic or inorganic peroxides, inorganic persulfates, for example potassium persulfate, azo initiators, for example azo-bis-isobutyronitrile, and redox systems consisting of an oxidizing agent, preferably a peroxide, and a reducing agent and optionally with addition of an aqueous emulsifier solution (for example anionic or nonionic emulsifiers, preferably sodium, potassium or ammonium salts of long-chain carboxylic acids containing 10 to 20 carbon atoms, for example potassium oleate, alkyl sulfates containing 10 to 20 carbon atoms, alkyl sulfonates containing 10 to 20 carbon atoms or alkali or ammonium salts of disproportionated abietic acid). The reaction may be carried out as a batch or semibatch process, continuously or by other processes, for example by continuous monomer addition.

Apart from emulsion polymerization, it is also possible in principle to use suspension, solution or bulk polymerization and any combination of these processes in known manner for the production of the graft products.

The graft products based on silicone rubbers have a rubber content of 30 to 90% by weight and preferably 40 to 80% by weight. The mean particle diameters ($d_{50}$ values) of the silicone rubber component are from 0.10 to 0.50 μm and preferably from 0.10 to 0.15 μm and from 0.25 to 0.50 μm.

The graft products based on EPDM rubber which are used for the production of the molding compounds according to the invention are obtained by radical polymerization of vinyl monomers or mixtures of vinyl monomers in the presence of EPDM rubber, the monomers being at least partly polymerized onto the rubber. Suitable vinyl monomers are, for example, styrene, α-methyl styrene, nucleus-substituted styrenes, such as p-methyl styrene, $C_{1-5}$ alkyl esters of acrylic or methacrylic acid, preferably methyl methacrylate, maleic anhydride, N-phenyl maleic imide or mixtures thereof.

The preferred monomer mixture is a combination of styrene and/or α-methyl styrene and acrylonitrile, preferably in a ratio by weight of (α-methyl)styrene to acrylonitrile of 1:1 to 10:1.

Suitable EPDM rubbers are, for example, polymers of ethylene and propylene additionally containing small quantities of an unconjugated diene, for example dicyclopentadiene, ethylidene norbornene, 1,4-hexadiene, 1,4-cycloheptadiene, 1,5-cyclooctadiene.

The production of the graft products is known and may be carried out in suspension or solution (see, for example, the Examples of EP-A 227 855) or emulsion (cf. EP- A 264 721).

The graft products based on EPDM rubbers have a rubber content of from 10 to 50% by weight and preferably from 10 to 40% by weight.

The mean particle diameters ($d_{50}$) of the polymers are in the range from 0.20 to 1.00 μm and preferably in the range from 0.25 to 0.40 μm or in the range from 0.35 to 0.60 μm.

Suitable acrylate rubbers are, for example, polymers based on $C_{1-8}$ alkyl acrylates (for example methyl, butyl, octyl or 2-ethylhexyl acrylate), optionally in admixture with up to 40% by weight other vinyl monomers. Polyfunctional monomers are copolymerized to crosslink the acrylate rubbers. Examples of polyfunctional monomers are esters of unsaturated carboxylic acids with a polyol (preferably 2 to 20 carbon atoms in the ester group), such as ethylene glycol dimethacrylate, esters of a polybasic carboxylic acid with an unsaturated alcohol (preferably 8 to 30 carbon atoms in the ester group), such as triallyl cyanurate, triallyl isocyanurate; divinyl compounds, such as divinyl benzene; esters of unsaturated carboxylic acids with unsaturated alcohols (preferably 6 to 12 carbon atoms in the ester group), such as allyl methacrylate; phosphoric acid esters, for example triallyl phosphate and 1,3,5-triacryloylhexahydro-s-triazine. Particularly preferred polyfunctional monomers are triallyl cyanurate, triallyl isocyanurate, triallyl phosphate, allyl methacrylate, ethylene glycol dimethacrylate and 1,3,5-triacryloylhexahydro-s-triazine.

The quantity of the polyfunctional monomers used for crosslinking is preferably from 0.05 to 10% by weight and more preferably from 0.1 to 5.0% by weight (based on the total quantity of crosslinked acrylate rubber). Other suitable acrylate rubber components are compounds of the so-called core/shell type, such as for example particulate acrylate rubbers containing a core of crosslinked polybutadiene (cf. EP-P 34 748).

The graft products based on acrylate rubbers are preferably produced by emulsion polymerization, at least partly crosslinked acrylate rubbers present in emulsion form being used as the graft base.

Graft polymerizations of this kind are known and are preferably carried out at temperatures in the range from 30° to 100° C. using radical initiators, for example organic or inorganic peroxides, inorganic persulfates, for example potassium persulfate, azo initiators, for example azo-bis-isobutyronitrile, and redox systems consisting of an oxidizing agent, preferably a peroxide, and a reducing agent and optionally with addition of an aqueous emulsifier solution (for example anionic or non-ionic emulsifier components, preferably sodium, potassium or ammonium salts of long-chain carboxylic acids containing 10 to 20 carbon atoms, for example potassium oleate, alkyl sulfates containing 10 to 20 carbon atoms, alkyl sulfonates containing 10 to 20 carbon atoms or alkali or ammonium salts of disproportionated abietic acid). The reaction may be carried out as a batch or semibatch process, continuously or by other processes, for example continuous monomer addition.

Apart from emulsion polymerization, it is also possible in principle to use suspension, solution or bulk polymerization and combinations of these processes in known manner for the production of the graft products.

The graft products based on acrylate rubbers have a rubber content of 30 to 80% by weight and preferably 40 to 75% by weight. The mean particle diameters ($d_{50}$ values) of the acrylate rubber component are from 0.05 to 1.00 μm, preferably from 0.08 to 0.15 μm or from 0.30 to 0.60 μm.

Particularly advantageous properties, more especially high strength, preferably at low temperatures, and simultaneously good processibility are obtained when graft products having selected particle sizes are combined with one another, namely I) graft products based on silicone rubber having mean particle diameters of 0.25 to 0.50 μm with graft products based on EPDM rubber having mean particle diameters of 0.25 to 0.40 μm and graft products based on acrylate rubber having mean particle diameters of 0.30 to 0.60 μm or II) graft products based on silicone rubber having mean particle diameters of 0.10 to 0.15 μm with graft products based on EPDM rubber having mean particle diameters of 0.35 to 0.60 μm and graft products based on acrylate rubber having mean particle diameters of 0.30 to 0.60 μm.

The molding compounds according to the invention may be produced by mixing their constituents A), B) and C) with one another at elevated temperatures, more especially at 100° C. to 280° C., for example in kneaders, on roll stands or in screw extruders. Where A), B) and C) are obtained in the form of suspensions, solutions or emulsions, they may be mixed and worked up together.

Typical additives such as, for example, antioxidants, lubricants, flameproofing agents, fillers, pigments, antistatic agents, may be added in typical quantities to the molding compounds.

The mixtures according to the invention are ageing-resistant thermoplastic molding compounds combining high strength at low temperatures with good processability where they are processed by extrusion, calendaring and injection molding.

They may be processed to ageing-resistant moldings, although they are also suitable as modifiers for other plastics, more especially for brittle vinyl monomer resins, such as styrene/acrylonitrile copolymers (SAN resins), α-methyl styrene/acrylonitrile copolymers, polystyrene, polymethyl methacrylate, polyvinyl chloride.

In this case, they are generally used in quantities of 5 to 80% by weight and preferably in quantities of 10 to 70% by weight, based on the modified product as a whole.

A particularly preferred mixture of this type consists of 5 to 80% by weight and preferably 10 to 70% by weight of the alloy according to the invention and 95 to 20% by weight and preferably 90 to 30% by weight of a thermoplastic resin of 5 to 40 parts by weight acrylonitrile and 95 to 60 parts by weight styrene, α-methyl styrene, p-methyl styrene, methyl methacrylate or mixtures thereof. These resins are known. They are often referred to as SAN resins. They may be combined with the mixture of the graft polymers by adding them during mixing of the graft polymers.

The resins must be present in the same physical form (solid, latex, solution) as the graft polymers. It is also possible to mix solid resins with prepared mixtures of the graft polymers or successively with the graft polymer components in internal mixers and extruders.

In the context of the invention, particle size always means the mean particle diameter $d_{50}$ as determined by means of the ultracentrifuge in accordance with W. Scholtan et al., Kolloid-Z. u. Z. Polymere 250 (1972), 782–796.

EXAMPLES AND COMPARISON EXAMPLES

A) Graft product based on a silicone rubber having a mean particle diameter ($d_{50}$) of 135 nm.

The silicone rubber emulsion is prepared as follows: 38.4 parts by weight octamethyl cyclotetrasiloxane, 1.2 parts by weight tetramethyl tetravinyl cyclotetrasiloxane and 1 part by weight γ-mercaptopropyl methyl dimethoxysilane are stirred with one another. 1.00 Part by weight dodecyl benzene sulfonic acid are then added, followed by the introduction over a period of one hour with intensive stirring of 58.4 parts by weight water. The pre-emulsion is homogenized twice at approximately 220 bar in a highpressure emulsifying machine. Another 0.5 part by weight dodecyl benzene sulfonic acid are then added. The emulsion is stirred for two hours at 85° C. and then for 36 hours at room temperature. It is neutralized using 5N NaOH. A stable emulsion having a solids content of approximately 36% is obtained; the mean particle diameter ($d_{50}$) is 135 nm.

Grafting reaction:

The following constituents are introduced into a reactor:
2107 parts by weight of the latex described above
1073 parts by weight water.

After initiation with a solution of 7.5 parts by weight potassium peroxodisulfate in 195 parts by weight water at 65° C., the following solutions are uniformly introduced into the reactor over a period of 4 hours:
solution 1:
  540 parts by weight styrene
  210 parts by weight acrylonitrile
solution 2:
  375 parts by weight water
  15 parts by weight sodium salt of $C_{14-18}$ alkyl sulfonic acids Polymerization is then completed over a period of 4 hours at 65° C. A latex having a solids content of approximately 33% by weight is obtained. After coagulation with an aqueous magnesium chloride/acetic acid solution, filtration and drying in vacuo, the graft product is obtained in the form of a white powder.

B) Graft product based on a silicone rubber having a mean particle diameter ($d_{50}$) of 320 nm.

The silicone rubber emulsion was prepared in the same way as described in A), except that 0.90 part by weight dodecyl benzene sulfonic acid was used and the pressure in the homogenizing step was approximately 190 bar. The grafting reaction was carried out as described in A).

C) Graft product based on an EPDM rubber (mean particle diameter ($d_{50}$) approximately 300 nm), Koblend W 4 of Montedipe, rubber content approx. 33%.

D) Graft product based on a core/shell acrylate rubber having a mean particle diameter ($d_{50}$) of approximately 480 nm.

7.5 Parts by weight potassium persulfate (dissolved in 2400 parts by weight water) are added to 22.44 parts by weight of a polybutadiene latex having a solids content of 40.1% and a mean particle diameter ($d_{50}$) of 100 nm, the following additions then being made at the same time over a period of 5 hours at 65° C.:

a) 22.5 parts by weight sodium salt of $C_{9-18}$ alkyl sulfonic acids (dissolved in 375 parts by weight water)

b) 1500 parts by weight n-butylacrylate and 1.5 parts by weight triallyl cyanurate.

Following an after-reaction time of 4 hours at 65° C., a core/shell acrylate rubber having a solids content of 35% and a mean particle diameter ($d_{50}$) of 480 nm is obtained.

4953 Parts by weight of this core/shell rubber latex are heated to 63° C., followed by the addition of a solution of 14.5 parts by weight potassium peroxodisulfate in 2016 parts by weight water. 835.2 Parts by weight styrene, 324.8 parts by weight acrylonitrile and 783.0 parts by weight of a 7.4% solution of $C_{9-18}$ alkyl sulfonic acids, sodium salt, in water are then simultaneously added with stirring over a period of 4 hours. Following a post-reaction time of 2 hours, a graft latex having a solids content of 33% is obtained, which is converted into the graft product in the form of a white powder by coagulation with an aqueous magnesium sulfate/acetic acid solution, filtration and drying in vacuo.

E) Styrene/acrylonitrile copolymer (weight ratio 72:28) having a molecular weight $\overline{M}w$ of approximately 115,000 and a heterogeneity index $U = \overline{M}w/\overline{M}n - 1$ of $\leq 2.0$ F) α-Methyl styrene/acrylonitrile copolymer (weight ratio 72:28) having a molecular weight $\overline{M}w$ of approximately 75,000 and a heterogeneity index $U = \overline{M}w/\overline{M}n - 1$ of $\leq 2.0$, The amounts by weight of components A) to F) shown in Table 1 were mixed with 2 parts by weight pentaerythritol tetrastearate and 0.1 part by weight of a silicone oil in an internal kneader at approximately 200° C. after which the resulting mixture was granulated and then processed by injection molding at 240° C. (75 second cycle). Impact strength was measured at −40° C. and notched impact strength at room temperature and at −40° C. in accordance with DIN 53 453 (unit: $kJ/m^2$) while softening point (Vicat B) was measured in accordance with DIN 53 460 (unit: °C.). Flow was evaluated by measurement of the MVI value in accordance with DIN 53 735 U (unit: $cm^3/10$ mins.).

The physical data of the molding compounds are shown in Table 2.

TABLE 1

| Molding compound | Compositions of the molding compounds Parts by weight | | | | | |
|---|---|---|---|---|---|---|
| | A | B | C | D | E | F |
| 1 | 15 | — | 22.5 | 12.5 | 50 | — |
| 2 | — | 15 | 22.5 | 12.5 | 50 | — |
| 3 | 13.5 | — | 20.3 | 11.2 | — | 55.2 |
| 4 | — | 13.3 | 20.3 | 11.2 | — | 55.2 |
| 5 (Comp.) | — | 45 | — | — | 55 | — |
| 6 (Comp.) | — | — | 68 | — | 32 | — |
| 7 (Comp.) | — | — | — | 37.5 | 62.5 | — |
| 8 (Comp.) | — | 40 | — | — | — | 60 |
| 9 (Comp.) | — | — | 61 | — | — | 39 |
| 10 (Comp.) | — | — | — | 33.5 | — | 66.5 |

TABLE 2

| Molding compound | Test data of the molding compounds | | | | |
|---|---|---|---|---|---|
| | RT $a_k$ | −40° C. $a_k$ | −40° C. $a_n$ | Vicat B | MVI |
| 1 | 17.9 | 6.4 | 68.0 | 97 | 6.3 |
| 2 | 18.7 | 6.5 | 83.7 | 97 | 8.0 |
| 3 | 15.2 | 6.6 | 77.2 | 104 | 1.9 |
| 4 | 13.9 | 5.5 | 76.5 | 103 | 2.0 |
| 5 (Comp.) | 15.4 | 10.6 | 96.5 | 96 | 2.2 |
| 6 (Comp.) | 20.5 | 3.5 | 69.8 | 92 | 17.2 |
| 7 (Comp.) | 5.6 | 2.5 | 48.0 | 102 | 8.1 |
| 8 (Comp.) | 13.8 | 5.0 | 75.1 | 105 | 0.6 |
| 9 (Comp.) | 15.2 | 3.9 | 70.4 | 96 | 1.5 |
| 10 (Comp.) | 4.8 | 2.7 | 48.3 | 108 | 2.6 |

$a_k$ = notched impact strength
$a_n$ = impact strength

What is claimed is:

1. Molding compositions of
   A) 5 to 95 parts by weight of a graft product of a mixture of 50 to 100 parts by weight styrene, α-methyl styrene, vinyl toluene, methyl methacrylate or mixtures thereof and 0 to 50 parts by weight acrylonitrile on a particulate silicone rubber with a mean particle diameter ($d_{50}$) of from 0.10 to 0.50 μm having a total rubber content of from 30 to 90% by weight based on the weight of the graft product and
   B) 95 to 5 parts by weight of a graft product of a mixture of 50 to 100 parts by weight styrene, α-methyl styrene, vinyl toluene, methyl methacrylate or mixtures thereof and 0 to 50 parts by weight acrylonitrile on a particulate EPDM rubber with a mean particle diameter ($d_{50}$) of from 0.20 to 1.00 μm having a total rubber content of from 10 to 50% by weight based on the weight of the graft product and
   C) 10 to 200 parts by weight based on 100 parts by weight A+B of a graft product of a mixture of 50 to 100 parts by weight styrene, α-methyl styrene, vinyl toluene, methyl methacrylate or mixtures thereof and 0 to 50 parts by weight acrylonitrile on a particulate acrylate rubber with a mean particle diameter ($d_{50}$) of from 0.05 to 1.00 μm having a total rubber content from 30 to 80% by weight based on the weight of the graft product.

2. Molding compositions of
   A) 20 to 80 parts by weight of a graft product of a mixture of mixture of 60 to 95 parts by weight styrene, α-methyl styrene, vinyl toluene, methyl methacrylate or mixtures thereof and 5 to 40 parts by weight acrylonitrile on a particulate silicone rubber with a mean particle diameter ($d_{50}$) of from 0.10 to 0.15 μm or from 0.25 to 0.50 μm having a total rubber content of from 40 to 80% by weight based on the weight of the graft product and
   B) 80 to 20 parts by weight of a graft product of a mixture of 60 to 95 parts by weight styrene, α-methyl styrene, vinyl toluene, methyl methacrylate or mixtures thereof and 5 to 40 parts by weight acrylonitrile on a particulate EPDM rubber with a mean particle diameter ($d_{50}$) of from 0.25 to 0.40 μm of from 0.35 to 0.60 μm having a total rubber content of from 10 to 40% by weight based on the weight of the graft product and
   C) 20 to 100 parts by weight (based on 100 parts by weight A+B) of a graft product of a mixture of 60 to 95 parts by weight styrene, α-methyl styrene, vinyl toluene, methyl methacrylate or mixtures thereof and 5 to 40 parts by weight acrylonitrile on a particulate acrylate rubber with a mean particle diameter ($d_{50}$) of from 0.08 to 0.15 μm of from 0.30 to 0.60 μm having a total rubber content of from 40 to 75% by weight based on the weight of the graft product.

3. Molding compositions comprising from 5 to 80% by weight of the molding composition claimed in claim 1 and from 95 to 20% by weight of a thermoplastic resin of 5 to 40 parts by weight acrylonitrile and 95 to 60 parts by weight styrene, α-methyl styrene, p-methyl styrene, methyl methacrylate or mixtures thereof wherein the % by weight is based on the total weight of the molding composition of claim 1 and the thermoplastic resin.

* * * * *